United States Patent Office 3,410,857
Patented Nov. 12, 1968

3,410,857
2-AMINO ETHYL PYRROL-3-YL KETONES
Karl Schoen, Kew Gardens, and Irwin J. Pachter, Woodbury, N.Y., assignors to Endo Laboratories Inc., Garden City, N.Y., a corporation of New York
No Drawing. Filed Oct. 12, 1964, Ser. No. 403,387
16 Claims. (Cl. 260—294.7)

ABSTRACT OF THE DISCLOSURE

Novel 2-amino ethyl pyrrol-3-yl ketones are disclosed which are useful as tranquilizers and anti-depressants.

This invention relates to, and has for its principal object the provision of novel 2-aminoethylpyrrol-3-yl ketones (having the structural Formula A, hereinafter set forth); the acid addition salts thereof; and processes for the preparation thereof.

These products have valuable pharmacodynamic activity, to wit, central nervous system activity and, in particular, are useful as tranquilizers and antidepressants.

The structural formula of the 2-aminoethylpyrrol-3-yl ketones is:

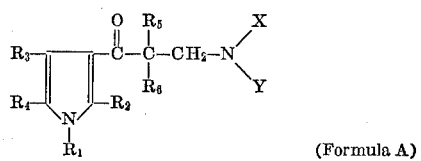

(Formula A)

wherein:

$R_1$ designates hydrogen, a lower alkyl group having a maximum of 4 carbon atoms, phenyl, benzyl or 2,3- or 4-pyridyl;
$R_2$, $R_3$ and $R_4$ designate alkyl, alkenyl or cycloalkyl having a maximum of 8 carbon atoms, halophenyl or (lower alkoxy)-phenyl or benzyl;
$R_3$ and $R_4$ may be linked to constitute an alicyclic ring having a maximum of 8 carbon atoms;
$R_5$ designates hydrogen, alkyl, alkenyl or cycloalkyl having a maximum of 8 carbon atoms, phenyl or benzyl;
$R_6$ designates hydrogen or methyl;
$R_5$ and $R_6$ may be linked to constitute a ring having a maximum of 6 carbon atoms;

X and Y designate:

hydrogen,
lower alkyl,
hydroxy-lower alkyl,
lower acyloxyalkyl,
carbamyloxy-lower alkyl,
phenyl lower alkyl,
cycloalkyl, X and Y may be linked to constitute a heterocyclic ring having a maximum of 8 carbon atoms such as:

piperidyl,
(lower alkyl) piperidyl,
di(lower alkyl) piperidyl,
(lower alkoxy) piperidyl,
hydroxypiperidyl,
(lower acyloxy) piperidyl,
pyrrolidyl,
(lower alkoxy) pyrrolidyl,
hydroxypyrrolidyl,
morpholino,
(lower alkyl) morpholino,
thiamorpholino,
(lower alkyl) dimorpholino,
di(lower alkyl) thiamorpholino,
(lower alkoxy) thiamorpholino,
piperazyl,
(lower alkyl) piperazyl,
di-alkyl(piperazyl),
(lower alkoxy) piperazyl,
phenylpiperazyl,
hydroxyalkylpiperazyl,
lower acyloxy-lower alkyl piperazyl, and
carbamyloxy-lower alkyl piperazyl.

The term "lower acyl," "lower alkyl" and "lower alkoxy" designate both straight and branched chain radicals having a maximum of 5 carbon atoms.

Acids useful for preparing the acid addition salts (pharmaceutically acceptable) includes inorganic acids such as hydrochloric, hydrobromic, sulfuric, nitric, phosphoric and perchloric acids, as well as organic acids such as oxalic, tartaric, citric, acetic, succinic, maleic and ethane disulfonic acids.

The compounds of Formula A can be prepared by the Manich reaction, using as starting materials pyrrol-3-yl ketones of Formula B, hereinafter set forth, and amines of Formula C, hereinafter set forth (preferably in the form of their salts, such as the hydrochloride and the like), in accordance with the following Reaction Scheme I:

REACTION SCHEME I

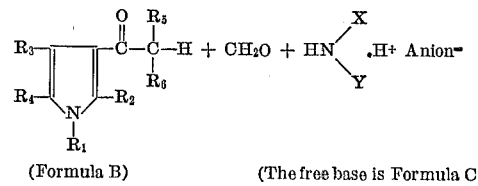

(Formula B)          (The free base is Formula C)

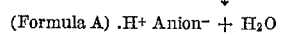

(Formula A) .H+ Anion- + H₂O

The symbols $R_1$, $R_2$, $R_3$, $R_4$, $R_5$ and $R_6$ in Formula B and X and Y in Formula C have the same significance as they do in Formula A.

The compounds of Formula A may also be prepared, in two steps, by using as starting materials, pyrroles of Formula D, hereinafter set forth, and β-halopropionyl halides of Formula E, hereinafter set forth, which interact, in Step 1, to form β-haloethyl-pyrrol-3-yl ketones of Formula F. In Step 2, a compound of Formula F interacts with an amine of Formula C. Those reactions are set forth in following Reaction Scheme II:

REACTION SCHEME II

Step 1

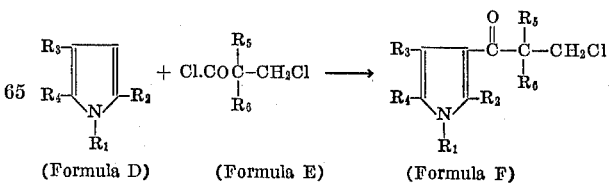

(Formula D)    (Formula E)    (Formula F)

Step 2

(Formula F) + (Formula C) → (Formula A)

In Step 1, the reaction is usually accomplished by the aid of aluminum chloride, although a process involving the Grignard reaction may occasionally prove advantageous.

In Step 2, the haloethyl ketone (Formula F) is permitted to react with an excess of ammonia or a primary or secondary amine in an inert solvent, such as methanol or butanol.

When the amine (Formula C) is volatile, the reaction is carried out in pressure vessels in order to permit the achievement of reaction temperatures of the order of 65 to 120° C.

This reaction sequence is of particular value when products are desired in which X or Y is hydrogen.

In the preparation of the Mannich bases (Formula A) of this invention, an amine salt is generally used, although the corresponding free amines can, at times, be employed. The amine salt may be formed from the amine and an acid HX (wherein X designates an anionic equivalent) which may be inorganic or organic.

The formaldehyde may be in the form of paraformaldehyde or in the form of an aqueous solution.

The reactions are best carried out in suitable solvents such as lower alcohols, e.g., methanol or butanol, water, acetic acid or Cellosolve (2-ethoxyethanol). They can be carried out at temperatures from below room temperature to reflux, although some heating is generally advantageous.

Preparation of the pyrrol-3-yl ketones

The pyrrol-3-yl ketones (Formula B) may be prepared by the reduction of an α-oximino ketone in the presence of a 1,3-diketone, in accordance with the following Reaction Scheme III:

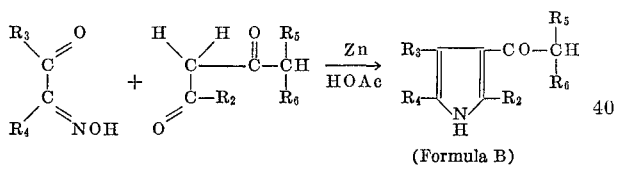

(Formula B)

Condensation occurs during the reduction process to produce the final products. This process is most useful when the 1,3-diketone is a symmetrical compound. When the 1,3-diketone is asymmetrical, mixtures are obtained.

To avoid formation of such mixtures, alternate routes, involving the acylation of 2,4,5-tri-substituted and 1,2,4,5-tetra-substituted pyrroles may be employed. The acylation of these compounds is accomplished by various methods known to the art. One is the Friedel-Crafts reaction in which acid chlorides or acid anhydrides react in suitable solvents, such as carbon disulfide, nitrobenzene or tetrachloroethane with the pyrrole in the presence of anhydrous aluminum chloride as catalyst in accordance with the following reaction scheme:

REACTION SCHEME IV

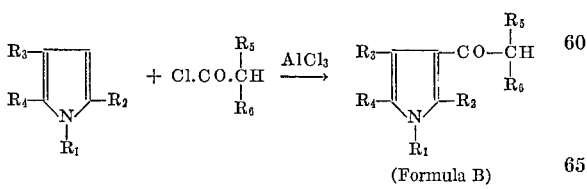

(Formula B)

Another method of preparing compounds of Formula B consists in reacting the magnesium or cadmium Grignard derivative of the pyrrole with an acid chloride.

A still further method consists in reacting the pyrrole, in an inert solvent, such as ether or chloroform, with a nitrile in the presence of hydrogen chloride to form an imino derivative, which upon hydrolysis, yields the pyrrol-3-yl ketone.

Alternatively, when $R_1$ in Formula B is H, N-alkyl and N-arylalkyl intermediates may be prepared from 2,4,5-trisubstituted pyrrole-3-yl ketones by the following Reaction Scheme V:

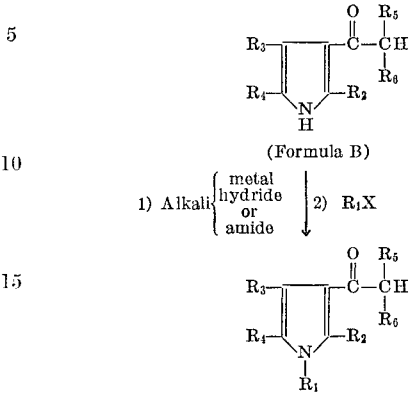

Treatment with an alkali metal such as lithium, potassium or sodium or an alkali metal hydride or amide, such as lithium hydride or sodium amide, affords a 1-metallo derivative which then reacts with an alkyl halide or sulfate ($R_1X$) to produce the desired product.

Preparation of pyrroles

The tri- and tetra-substituted pyrroles, per se, Formula D, are prepared by methods well known in the art. In our experience, the reductive condensation of α-oximino ketones with acylacetic esters, followed by hydrolysis and decarboxylation with hot sulfuric acid has proved of great value for the preparation of 2,4,5-tri-substituted pyrroles.

The reactions may be exemplified as follows:

REACTION SCHEME VI

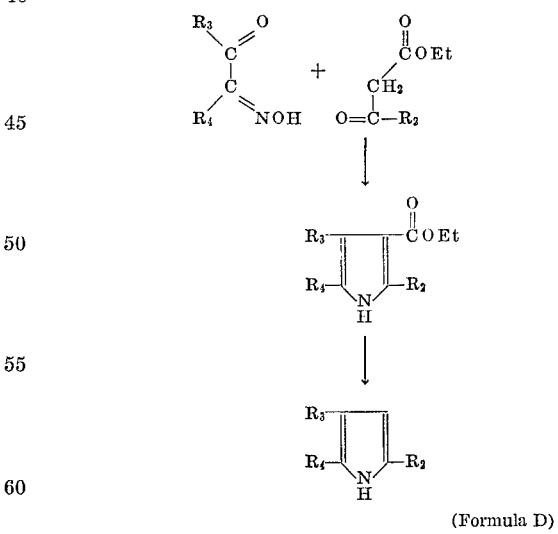

(Formula D)

$R_2$, $R_3$ and $R_4$ have the same significance as in Formula A.

The 2,4,5-tri-substituted pyrroles (Formula D) are converted into 1,2,4,5-tetra-substituted pyrroles through treatment with suitable agents for effecting substitution of the hydrogen in the 1-position, as for example, with alkyl and arylalkyl halides or sulfates. Another useful method for preparing the tetra-substituted compounds has recently been described by B. Helferich and W. Klebert (Ann. 657:79 (1962)).

The pyrrol-3-yl ketones (compounds of Formula B) are members of a group of pharmacodynamically useful compounds, muscle relaxants and sedatives, represented by the following structural Formula B*:

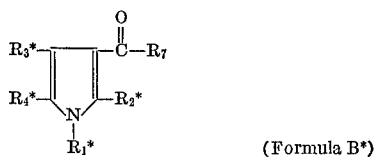

(Formula B*)

Wherein:

$R_1^*$ is hydrogen or a lower alkyl group of not more than 4 carbon atoms, phenyl, benzyl or 2-, 3- or 4-pyridyl;

$R_2^*$, $R_3^*$, $R_4^*$ are hydrogen or alkyl, alkenyl or cycloalkyl groups of not more than 8 carbon atoms, phenyl or benzyl;

$R_7$ is hydrogen, an alkyl or alkenyl group of not more than 8 carbon atoms, a cycloalkyl group of not more than 8 carbon atoms, benzyl or phenethyl.

Compounds of Formula A (either per se or the described acid addition salts thereof) may be put up in customary forms of pharmaceutical compositions compounded from the active substance (based on Compound A) and vehicular materials. Such pharmaceutical compositions comprise tablets, capsules, syrups, injectable solutions, suppositories and the like. Thus, the active substance (Formula A) may be taken in doses of 10 to 200 mgs., for example, in the form of tablets or capsules in doses of 10–200 mgs.; in syrups at 2–20 mg./ml. concentration; in parenterally injectable solutions in 10–50 mgs./ml. concentration; in suppositories in 10–200 mgs.

Compounds of Formula B* (either per se or the acid addition salts thereof with pharmaceutically acceptable acids) may likewise be put up in customary forms of pharmaceutical compositions compounded from the active substance (based on Compound B*) and vehicular materials. Such pharmaceutical compositions comprise tablets, capsules, syrups, injectable solutions, suppositories and the like. The dose of the active substance can range from 25 to 300 mgs.

The following are examples in accordance with the invention. The temperatures are in degrees centigrade.

EXAMPLE 1

2-dimethylaminoethyl 2,4,5-trimethylpyrrol-3-yl ketone hydrochloride

Methyl 2,4,5-trimethylpyrrol-3-yl ketone, M.P. 207–209°, was prepared by the method of Fischer and Bartholomäus (Zeit. Physiol. Chem., 77, 197 (1915)). The ketone 15.1 g. (0.1 mole), 12.3 g. dimethylamine hydrochloride (0.15 mole), and 4.5 g. paraformaldehyde (0.15 mole) were refluxed in 250 ml. anhydrous ethanol. After 24 hours, another 1.5 g. paraformaldehyde was added. After refluxing for a total of 48 hours, the solution was evaporated to dryness in vacuo on a steam bath and the solid residue crystallized from ethanol with addition of charcoal. After 2 recrystallizations from ethanol, the M.P. was 197–198.5°.

EXAMPLE 2

2-piperidinoethyl 2,4,5-trimethylpyrrol-3-yl ketone hydrochloride

Methyl 2,4,5-trimethylpyrrol-3-yl ketone 15.1 g. (0.1 mole), 16.0 g. piperidine hydrochloride (0.13 mole), and 4.5 g. paraformaldehyde (0.15 mole) were refluxed in 250 ml. anhydrous ethanol. After 24 hours, another 1.5 g. paraformaldehyde was added and the mixture refluxed for 48 hours. The solution was brought to dryness in vacuo on a steam bath and the oily residue digested with acetone whereupon it solidified. The solid was crystallized several times from isopropanol from which it separates with solvent of crystallization which is lost at 100–110°. After recrystallization from anhydrous ethanol-acetone, the M.P. was 184–185°.

EXAMPLE 3

2-pyrrolidinoethyl 2,4,5-trimethylpyrrol-3-yl ketone hydrochloride

This compound was prepared according to the method of Example 2 from methyl 2,4,5-trimethylpyrrol-3-yl ketone, pyrrolidine hydrochloride and paraformaldehyde. For purification the salt was crystallized repeatedly from isopropanol, followed by crystallization from ethanol/ether and ethanol. It crystallizes in the form of a hemihydrate which retains water even on drying at 110° and 1 mm.; M.P. 150–153°.

EXAMPLE 4

2,5-dimethyl-4-ethylpyrrol-3-yl 2-dimethylaminoethyl ketone 2,5-dimethyl-4-ethylpyrrol-3-yl methyl ketone, M.P. 170–171° was prepared by the method of Vecchi (Gazz. Chim. Ital., 44, 473 (1914)). The ketone 16.5 g. (0.1 mole), 12.3 g. dimethylamine hydrochloride (0.15 mole) and 4.5 g. paraformaldehyde (0.15 mole) were refluxed in 250 ml. anhydrous ethanol; 1.5 g. paraformaldehyde was added after 24 hours and the mixture refluxed for a total of 48 hours. The solution was evaporated to dryness in vacuo, the residue treated with acetone, the insoluble material filtered off, washed with acetone and dried. It was dissolved in water and upon addition of excess ammonia, the base precipitated as an oil which solidified on standing overnight in the refrigerator. After repeated crystallizations from benzene-heptane and heptane alone, the M.P. was 72.5–73.5°.

EXAMPLE 5

2,4-diethyl-5-methylpyrrol-3-yl 2-(1-dimethylamino) propyl ketone hydrochloride 2,4-diethyl-5-methylpyrrol-3-yl ethyl ketone, M.P. 144°, was prepared from 3,5-heptanedione and 2-oximino-3-pentanone. It was converted into the Mannich base by the procedure of Example 1 and purified as the hydrochloride salt by crystallization from isopropanol; M.P. 159–160°.

Analogously, ethyl 2-ethyl-4,5-dimethylpyrrol-3-yl ketone may be prepared by the method of Fischer and Bartholomäus (Ber., 45, 1983 (1912)) and converted into 2-ethyl-4,5-dimethylpyrrol-3-yl 2-(1-dimethylamino)propyl ketone.

EXAMPLE 6

2,4-dimethyl-5-isopropylpyrrol-3-yl methyl ketone 4-methyl-3-oximino-2-pentanone, B.P./52 mm. 128°, 51.6 g. (0.4 mole) and 40 g. 2,4-pentanedione (0.4 mole) were dissolved in 700 ml. of 70% acetic acid. With vigorous stirring 60 g. zinc dust was added in small portions. The mixture heated up spontaneously. After addition of the zinc, the mixture was refluxed for 1 hour with stirring, poured on ice, and the precipitate filtered off, washed with water, dried, and crystallized from toluene; M.P. 163–164°.

EXAMPLE 7

2,4-dimethyl-5-isopropylpyrrol-3-yl 2-dimethylaminoethyl ketone hydrochloride

This compound is prepared according to the method of Example 1 from 2,4-dimethyl-5-isopropylpyrrol-3-yl methyl ketone, dimethylamine hydrochloride, and paraformaldehyde. The hydrochloride salt was purified by crystallizations from ethanol and anhydrous isopropanol. It contains solvent of crystallization which is lost by drying at 100° in vacuo; M.P. 151–155°.

EXAMPLE 8

5-butyl-2,4-dimethylpyrrol-3-yl methyl ketone

This compound is prepared according to the method of Example 6 from 3-oximino-2-heptanone, M.P. 55–57°, and 2,4-pentanedione; M.P. 134°.

EXAMPLE 9

5-butyl-2,4-dimethylpyrrol-3-yl 2-dimethylaminoethyl ketone hydrochloride

This compound is prepared according to the method of Example 1 from 5-butyl-2,4-dimethylpyrrol-3-yl methyl ketone, dimethylamine hydrochloride and paraformaldehyde. After recrystallization from ethanol, the hydrochloride salt melts at 158–160°.

EXAMPLE 10

5-butyl-2,4-dimethylpyrrol-3-yl 2-piperidinoethyl ketone

This compound is prepared according to the method of Example 1 from 5-butyl-2,4-dimethylpyrrol-3-yl methyl ketone, piperidine hydrochloride and paraformaldehyde. The free base was crystallized from cyclohexane and melted at 80–83°.

EXAMPLE 11

4-butyl-2,5-dimethylpyrrol-3-yl methyl ketone

This compound is prepared according to the method of Example 6 from 2-oximino-3-heptanone, B.P./4 mm. 85–86°, and 2,4-pentanedione; M.P. 124–126°.

EXAMPLE 12

4-butyl-2,5-dimethylpyrrol-3-yl 2-dimethylaminoethyl ketone hydrochloride

This compound is prepared according to the method of Example 1 from 4-butyl-2,5-dimethylpyrrol-3-yl methyl ketone, dimethylamine hydrochloride and paraformaldehyde. After crystallization from ethanol, the hydrochloride melts at 157–160°.

EXAMPLE 13

4-butyl-2,5-dimethylpyrrol-3-yl 2-piperidinoethyl ketone

This compound is prepared according to the method of Example 1 from 4-butyl-2,5-dimethylpyrrol-3-yl methyl ketone, piperidine hydrochloride and paraformaldehyde. After crystallization from ethanol, the hydrochloride melts at 117–120°.

Utilizing the preparative method described under Example 1, the following related compounds can also be prepared starting from 4-butyl-2,5-dimethylpyrrol-3-yl methyl ketone and the hydrochloride of the appropriate heterocyclic base.

4-butyl-2,5-dimethylpyrrol-3-yl 2-(4-hydroxypiperidino) ethyl ketone.
4-butyl-2,5-dimethylpyrrol-3-yl 2-(4-phenyl-1-piperazyl) ethyl ketone.
4-butyl-2,5-dimethylpyrrol-3-yl 2-(4-carbamyloxyethyl-piperazyl) ethyl ketone.

EXAMPLE 14

2,4-dimethyl-5-isobutylpyrrol-3-yl methyl ketone

This compound is prepared from 5-methyl-3-oximino-2-hexanone, B.P. 75°/3 mm., and 2,4-pentanedione according to the method of Example 6; M.P. 150–152°.

EXAMPLE 15

2,4-dimethyl-5-isobutylpyrrol-3-yl 2-dimethylaminoethyl ketone hydrochloride

This compound is prepared according to the method of Example 1 from 2,4-dimethyl-5-isobutylpyrrol-3-yl methyl ketone, dimethylamine hydrochloride and paraformaldehyde. The hydrochloride salt, crystallized from ethanol, melts at 161–163°.

EXAMPLE 16

2,5-dimethyl-4-isobutylpyrrol-3-yl methyl ketone

This compound is prepared according to the method of Example 6 from 2-oximino-5-methyl-3-hexanone, B.P./38 mm. 130°, and 2,4-pentanedione. After recrystallization from dilute acetic acid and from water, colorless crystals were obtained, M.P. 184–187°.

EXAMPLE 17

2-dimethylaminoethyl 4-isobutyl-2,5-dimethylpyrrol-3-yl ketone hydrochloride 4-isobutyl-2,5-dimethylpyrrol-3-yl methyl ketone 21 g. (0.15 mole), 20.4 g. dimethylamine hydrochloride (0.25 mole) and 7.5 g. paraformaldehyde (0.25 mole) were refluxed in a nitrogen atmosphere in 300 ml. ethanol. After 20 hours another 3 g. paraformaldehyde was added and refluxing continued for a total of 40 hours. The solution was evaporated to dryness in vacuo, the residue dried sharply at 70° and 15 mm. and the remaining solid refluxed for 45 minutes with 250 ml. acetone. After cooling to room temperature, the solvent was removed by filtration, the residue washed on the filter with fresh acetone, dried and crystallized repeatedly from anhydrous ethanol, M.P. 188–188.5°.

EXAMPLE 18

2,5-dimethyl-4-isobutylpyrrol-3-yl 2-piperidinoethyl ketone hydrochloride

This compound is prepared according to the foregoing Example 17 from 4 - isobutyl - 2,5 - dimethylpyrrol- 3 - yl methyl ketone, piperidine hydrochloride and paraformaldehyde. Crystallized from anhydrous ethanol, M.P. 179–181°.

Utilizing the preparation method of Example 17, N-methylpiperazine hydrochloride affords 2,5-dimethyl-4-isobutylpyrrol-3-yl 2-(N-methylpiperazyl)ethyl ketone hydrochloride.

EXAMPLE 19

4-benzyl-2-methyl-5-phenylpyrrol-3-yl methyl ketone

This compound is prepared according to the method of Example 6 from 2-oximino-1,3-diphenyl-2-propanone and 2,4-pentanedione. Upon crystallization from toluene, it melted at 164–165°.

EXAMPLE 20

4-benzyl-2-methyl-5-phenylpyrrol-3-yl 2-dimethylaminoethyl ketone hydrochloride

This compound is prepared as described in Example 1 from 4 - benzyl - 2 - methyl-5-phenylpyrrol-3-yl methyl ketone, dimethylamine hydrochloride and paraformaldehyde; M.P. 125–130°.

EXAMPLE 21

2-dimethylaminoethyl 2,4-dimethyl-5-phenylpyrrol-3-yl ketone

This compound is prepared according to the method of Example 4 from methyl 2,4-dimethyl-5-phenylpyrrol-3-yl ketone (P. G. Haines and A. Eisner, J. Am. Chem. Soc. 72, 4618 (1950)), dimethylamine hydrochloride and paraformaldehyde; M.P. 123–126°.

EXAMPLE 22

2,5-dimethyl-4-propylpyrrol-3-yl methyl ketone

This compound is prepared according to the method of Example 6 from 2-oximino-3-hexanone and 2,4-pentanedione; M.P. 148–149°.

EXAMPLE 23

2-dimethylaminoethyl 2,5-dimethyl-4-propylpyrrol-3-yl ketone hydrochloride

This compound is prepared according to the method of Example 1 from 2,5-dimethyl-4-propylpyrrol-3-yl methyl ketone, dimethylamine hydrochloride and paraformaldehyde; M.P. 146–148°.

EXAMPLE 24

4-amyl-2,5-dimethylpyrrol-3-yl methyl ketone

This compound is prepared by the method of Example 6 from 2-oximino-3-octanone, B.P./6 mm. 130° and 2,4-pentanedione. Crystallized from cyclohexane, M.P. 100–104°.

EXAMPLE 25

4-amyl-2,5-dimethylpyrrol-3-yl 2-dimethylaminoethyl ketone hydrochloride

This compound is prepared according to the method of Example 1 from 4-amyl-2,5-methylpyrrol-3-yl ketone, dimethylamine hydrochloride and paraformaldehyde. The hydrochloride salt was crystallized from anhydrous ethanol, M.P. 160–161°.

EXAMPLE 26

5-cyclopentyl-2,4-dimethylpyrrol-3-yl methyl ketone

This compound is prepared by the method of Example 6 from 1-cyclopentyl-1-oximino-2-propanone, M.P. 100–102° and 2,4-pentanedione. Crystallized from anhydrous ethanol, M.P. 164.5–165.5°.

EXAMPLE 27

5-cyclopentyl-2,4-dimethylpyrrol-3-yl 2-dimethylaminoethyl ketone hydrochloride

This compound is prepared according to the method of Example 1 from 5-cyclopentyl-2,4-dimethylpyrrol-3-yl methyl ketone, dimethylamine hydrochloride and paraformaldehyde.

EXAMPLE 28

5-butyl-2-ethyl-4-methylpyrrol-3-yl ethyl ketone

This compound is prepared according to the method of Example 6 from 3-oximino-2-heptanone, M.P. 55–57°, and 3,5-heptanedione. Colorless crystals from water, M.P. 55–58°, B.P./2 mm. 134–136°.

EXAMPLE 29

2-(1-benzylmethylamino)propyl 5-butyl-2-ethyl-4-methylpyrrol-3-yl ketone hydrochloride This compound is prepared according to the method of Example 1 from 5-butyl-2-ethyl-4-methylpyrrol-3-yl ethyl ketone, benzylmethylamine hydrochloride and paraformaldehyde.

EXAMPLE 30

2-methyl-4,5,6,7-tetrahydroindol-3-yl 2-piperidinoethyl ketone

This compound is prepared from methyl 2-methyl-4,5,6,7-tetrahydroindol-3-yl ketone (Treibs and Dinelli, Ann. 517, 152 (1935)), piperidine hydrochloride and paraformaldehyde by the method of Example 1.

EXAMPLE 31

2-dimethylaminoethyl 2-methyl-4,5,6,7-tetrahydroindol-3-yl ketone

This compound is prepared from methyl 2-methyl-4,5,6,7-tetrahydroindol-3-yl ketone, dimethylamine hydrochloride and paraformaldehyde by the method of Example 1.

EXAMPLE 32 propyl 2,4,5-trimethylpyrrol-3-yl ketone

To 20 g. of 2,3,5-trimethylpyrrole in 200 g. of carbon disulfide was added 23 g. of butyryl chloride and 20 g. of aluminum chloride. After 30 minutes, the carbon disulfide was decanted and the remaining dark red resin was decomposed with water. The dark product which separated was collected by filtration, dried and extracted with heptane in a Soxhlet apparatus. The black residue was discarded. The heptane solution was concentrated and cooled and the crystalline product which separated was collected and recrystallized from methanol, M.P. 121°.

EXAMPLE 33

2-(1-dimethylamino)butyl 2,4,5-trimethylpyrrol-3-yl ketone hydrochloride

This compound is prepared according to the method of Example 1 from propyl 2,4,5-trimethylpyrrol-3-yl ketone, dimethylamine hydrochloride and paraformaldehyde. The hydrochloride was crystallized from ethanol-acetone, M.P. 166–168°.

Through use of 4-methylpiperidine hydrochloride in place of dimethylamine hydrochloride, 2-[1-(4-methylpiperidino)butyl] - 2,4,5 - trimethylpyrrol-3-yl ketone hydrochloride can be prepared.

EXAMPLE 34 amyl 2,4,5-trimethylpyrrol-3-yl ketone

This compound is prepared from 2,3,5-trimethylpyrrole, hexanoyl chloride and aluminum chloride by the method of Example 32; M.P. 92–94°.

EXAMPLE 35

2-(1-diethylamino)hexyl 2,4,5-trimethylpyrrol-3-yl ketone hydrochloride

This compound is prepared according to Example 1 from amyl-2,4,5-trimethylpyrrol-3-yl ketone, diethylamine hydrochloride and paraformaldehyde.

EXAMPLE 36 isopropyl 2,4,5-trimethylpyrrol-3-yl ketone

This compound is prepared from 2,3,5-trimethylpyrrole, isobutyryl chloride and aluminum chloride by the method of Example 31; M.P. 131°.

EXAMPLE 37

2-(1-dimethylamino-2-methyl)propyl 2,4,5-trimethylpyrrol-3-yl ketone hydrochloride This compound is prepared after prolonged reflux according to the method of Example 1 from isopropyl 2,4,5-trimethylpyrrol-3-yl ketone, dimethylamine hydrochloride and paraformaldehyde.

EXAMPLE 38 ethyl 4,5-dimethyl-2-propyl-3-carboxylate

Ethyl butyrylacetate 100 g. (0.63 mole) and 64 g. 2-oximino-3-butanone (0.63 mole) were dissolved in 800 ml. of 70% acetic acid. With efficient stirring, 90 g. zinc dust was added in small portions. The mixture heated up spontaneously and near the end of the addition, it came to boiling. After the addition of the zinc, the mixture was refluxed for 30 minutes with good stirring, poured on 500 g. ice and the major portion of the acid neutralized with solid sodium bicarbonate. A solid precipitate formed which, after standing over night, was filtered off and washed with water. For purification, the ester was distilled in vacuo B.P./0.3 mm., 117–118°, then crystallized repeatedly from cyclohexane. It forms colorless shiny leaflets, M.P. 82–83°.

EXAMPLE 39

4,5-dimethyl-2-propylpyrrole 25 g. ester prepared according to Example 38 was added in portions to a mixture of 60 ml. water and 180 ml. concentrated sulfuric acid at 100°. A lively development of carbon dioxide occurred and the reaction was completed by heating the solution on the steam bath under nitrogen for 1½ hours. The solution was cooled to room temperature and poured on 500 g. ice. After standing overnight, a small amount of dark tarry material was filtered off and the solution neutralized first with solid sodium bicarbonate, then near the end with 50% potassium hydroxide solution keeping the temperature below 35°.

An oil separated which was extracted with 5 portions of 150 ml. ether, dried over potassium hydroxide, the solvent evaporated and the residue distilled. The compound is a colorless oil which turns pale yellow in light, B.P./16 mm., 98–99°, $n^{21.5°}_D$ 1.4975, slight aromatic odor.

EXAMPLE 40

4,5-dimethyl-2-propylpyrrol-3-yl methyl ketone 4,5-dimethyl-2-propylpyrrole 12 g. and 15 ml. acetyl chloride were dissolved in 120 ml. carbon disulfide and with stirring, 12 g. anhydrous aluminum chloride was added in portions. A vigorous reaction occurred and the liquid came to refluxing. The mixture was stirred for 2 hours, kept at room temperature overnight, and the solvent evaporated in vacuo at 40°. The residue was poured on ice. A red solid formed which was filtered, washed with water, dried and crystallized repeatedly from ethanol. Colorless long needles, M.P. 140–141°, were obtained.

EXAMPLE 41

2-dimethylaminoethyl 4,5-dimethyl-2-propylpyrrol-3-yl ketone hydrochloride

This compound is prepared according to the procedure of Example 1 from 4,5-dimethyl-2-propylpyrrol-3-yl methyl ketone, dimethylamine hydrochloride and paraformaldehyde.

EXAMPLE 42

Ethyl 5-butyl-2,4-dimethylpyrrole-3-carboxylate 3-oximino-2-heptanone, M.P. 55–57°, 85.8 g. (0.6 mole) and 78 g. ethyl acetoacetate (0.6 mole) were dissolved in 750 ml. of 70% acetic acid and 90 g. zinc dust added in portions in the course of 10 minutes, with efficient stirring. The mixture became hot and near the end of the addition, it came to boiling. The mixture was refluxed for 30 minutes, then poured on 1 kg. ice. A solid formed which was filtered off, washed with water, dried and crystallized from cyclohexane, M.P. 92–93°.

EXAMPLE 43

5-butyl-2,4-dimethylpyrrole

The ester described in Example 42 (150 g.) was added in small portions to a mixture of 300 ml. water and 900 ml. concentrated sulfuric acid at 100°. The mixture was heated on a steam bath under nitrogen until the liberation of gas was finished, which took about 1 hour. The solution was poured on 4 kg. ice. After standing over night, a black tarry material was filtered off and the solution neutralized first with sodium bicarbonate, then near the end, with sodium hydroxide. An oil separated which was taken up in ether, dried over potassium hydroxide and distilled in vacuo. A pale yellow oil, B.P./16 mm., 107–110°, $n^{23°}_D$ 1.4910 was obtained. The oil is sensitive to oxygen and turns brown in the air; it must be kept under nitrogen.

EXAMPLE 44

5-butyl-2,4-dimethylpyrrol-3-yl ethyl ketone 5-butyl-2,4-dimethylpyrrole 25 g. (Example 43) and 30 ml. propionyl chloride were dissolved in 250 ml. carbon disulfide and 30 g. anhydrous aluminum chloride added in portions with stirring. A vigorous reaction occurred and the liquid came to refluxing. After stirring for 1 hour and standing overnight at room temperature, the solvent was evaporated in vacuo at 40° and the residue decomposed with ice. A red oil separated which solidified within 20 minutes. The solid was filtered, washed with water, dried, and crystallized from cyclohexane, M.P. 88–89°.

EXAMPLE 45

5-butyl-2,4-dimethylpyrrol-3-yl 2-(1-thiamorpholino)propyl ketone hydrochloride

This compound is prepared according to the method of Example 1 from 5-butyl-2,4-dimethylpyrrol-3-yl ethyl ketone, thiamorpholine hydrochloride and paraformaldehyde.

EXAMPLE 46

1-benzyl-2,4,5-trimethylpyrrol-3-yl methyl ketone

This compound is prepared according to the procedure of Example 31 from 1-benzyl-2,3,5-trimethylpyrrole (Helferich and Klebert, Ann., 657, 79 (1962)), acetyl chloride and aluminum chloride.

EXAMPLE 47

1-benzyl-2,4,5-trimethylpyrrol-3-yl 2-dimethylaminoethyl ketone

This compound is prepared according to the procedure of Example 1 from 1-benzyl-2,3,5-trimethylpyrrol-3-yl methyl ketone, diamethylamine hydrochloride and paraformaldehyde.

EXAMPLE 48

1-ethyl-2,4,5-trimethylpyrrol-3-yl methyl ketone

This compound is prepared according to the procedure of Example 31 from 1-ethyl-2,3,5-trimethylpyrrole (Hess, Wissing and Suchier, Ber., 48, 1865 (1915)), acetyl chloride and aluminum chloride.

EXAMPLE 49

1-ethyl-2,4,5-trimethylpyrrol-3-yl 2-piperidinoethyl ketone hydrochloride

This compound is prepared according to the procedure of Example 1 from 1-ethyl-2,3,5-trimethylpyrrol-3-yl methyl ketone, piperidine hydrochloride and paraformaldehyde.

EXAMPLE 50

5-octyl-2,4-dimethylpyrrol-3-yl methyl ketone

This compound is prepared according to the method of Example 6 from 3-oximino-2-undecanone, M.P. 51.5–52.5°, and 2,4-pentanedione; M.P. 102.5–103.5°.

EXAMPLE 51

5-octyl-2,4-dimethylpyrrol-3-yl 2-dimethylaminoethyl ketone

This compound is prepared according to the method of Example 1 from 5-octyl-2,4-dimethylpyrrol-3-yl ketone, dimethylamine hydrochloride and paraformaldehyde.

EXAMPLE 52

5-ethyl-4-methyl-2-propylpyrrol-3-yl propyl ketone

This compound is prepared according to the method of Example 6 from 3-oximino-2-pentanone and 4,6-nonanedione. Purified by distillation, B.P./165°/4 mm., and crystallization from hexane, M.P. 70–72°.

EXAMPLE 53

5-ethyl-4-methyl-2-propylpyrrol-3-yl 2-(1-dimethylamino)butyl ketone hydrochloride This compound is prepared according to the method of Example 1 from 5-ethyl-4-methyl-2-propylpyrrol-3-yl ketone, dimethylamine hydrochloride, and paraformaldehyde, M.P. 124–126.5°.

EXAMPLE 54

4,5-dimethyl-2-propylpyrrol-3-yl propyl ketone

This compound is prepared according to the method of Example 6 from 2-oximino-3-butanone and 4,6-nonanedione. Purified by distillation at 167°/4 mm. it forms a viscous yellow oil which solidifies at room temperature. M.P. after crystallization from hexane, 76–77°.

EXAMPLE 55

2-(1-dimethylamino)butyl 4,5-dimethyl-2-propylpyrrol-3-yl ketone hydrochloride

This compound is prepared according to the method of Example 1 from 4,5-dimethyl-2-propylpyrrol-3-yl propyl ketone, dimethylamine hydrochloride, and paraformaldehyde, M.P. 162–164°.

EXAMPLE 56

2-chloroethyl 2,4,5-trimethylpyrrol-3-yl ketone

A solution of 10 g. of 2,3,5-trimethylpyrrole in 100 ml. of carbon disulfide was cooled to 10° and treated with 20 g. of β-chloropropionyl chloride and 15 g. of aluminum chloride. When the initial reaction subsided, the mixture was warmed gently on a steam bath for one hour, and the carbon disulfide layer was then decanted and discarded. The residue was stirred with water and the solid that separated was collected and recrystallized from ether-cyclohexane. The product, on heating, begins to turn red at about 135° and then gradually turns black without melting at a definite point.

EXAMPLE 57

2-cyclohexylaminoethyl 2,4,5-trimethylpyrrol-3-yl ketone hydrochloride

A 3 g. sample of 2-chloroethyl 2,4,5-trimethylpyrrol-3-yl ketone, 15 ml. of ethanol and 10 ml. of cyclohexylamine were heated under reflux for 2 hours. The excess solvent was removed under reduced pressure and the residue was made basic with aqueous ammonia and extracted into ether. The ether was removed. The residue was dissolved in a little methanol and stirred with water. The product crystallized in the form of a hydrate. It was collected, dissolved in ether and converted into the hydrochloride. The latter was recrystallized from methanol and acetone, M.P. 196–197°.

2-methylamino 2,4,5-trimethylpyrrol-3-yl ketone hydrochloride can be similarly prepared using a pressurized saturated ethanolic solution of methylamine at 80°.

The active compounds of this invention may be taken in tablets or capsules in doses of 10–200 mg., in syrup at 2–20 mg./ml. concentration, in 10–200 mg. suppositories or by parenteral injection in 10–50 mg./ml. concentration. The following examples are illustrative.

EXAMPLE 58

| Ingredients: | Mg./tablet |
|---|---|
| 4-butyl-2,5-dimethylpyrrol-3-yl 2-piperidinoethyl ketone hydrochloride | 100 |
| Lactose USP (spray dried) | 170 |
| Starch USP | 10 |
| Magnesium stearate USP | 1 |
| Flavor | q.s. |

All above ingredients were passed through a 60-mesh sieve, blended for 30 minutes and compressed directly into tablets on a suitable tablet press at a weight of 206 mg., using a $^{11}\!\!/\!_{32}''$ biconcave scored punch.

EXAMPLE 59

| Ingredients: | Mg./capsule |
|---|---|
| 2 - dimethylaminoethyl 2,5-dimethyl-4-ethylpyrrol-3-yl ketone | 50 |
| Lactose USP | 100 |
| Magnesium stearate | 1 |
| Amorphous silicon dioxide (Cab-O-Sil) | 5 |

These ingredients were combined, blended and passed through a No. 1 screen of Fitzpatrick comminuator machine before encapsulating into a two-piece hard gelatin No. 3 capsule on a standard capsulating machine at a net weight of 126 mg.

EXAMPLE 60

| Ingredients: | Mg./ml. |
|---|---|
| 2-dimethylaminoethyl 2,4,5-trimethylpyrrol-3-yl ketone hydrochloride | 50 |
| Methylpharaben USP | mg 1.8 |
| Propylparaben USP | mg 0.2 |
| Water | q.s. |
| Sodium chloride, q.s. for isotonicity. | |

The above ingredients are combined in sterile solutions for parenteral use.

EXAMPLE 61

| Ingredients: | Grams/liter |
|---|---|
| 2-dimethylaminoethyl - 2,5 - dimethyl-4-pyropylpyrrol-3-yl ketone hydrochloride | 10 |
| Granulated sugar | 600 |
| Flavor | q.s. |
| Color | q.s. |
| Sodium benzoate | 1 |
| Deionized water | q.s. |

All above ingredients are dissolved in water, combined and made up to a volume of one liter.

EXAMPLE 62

| Ingredients: | Mg./suppository |
|---|---|
| 2-dimethylaminoethyl 2-methyl-4,5,6,7-tetrahydroindol-3-yl ketone | mg 100 |
| Cocoa butter | q.s. |

The drug and cocoa butter are combined, mixed thoroughly and formed into 2-gram suppositories.

It will be understood that the foregoing description of the invention and the examples set forth are merely illustrative of the principles thereof. Accordingly, the appended claims are to be construed as defining the invention within the full spirit and scope thereof.

We claim:

1. A compound selected from the group consisting of:

(1) bases of Formula A:

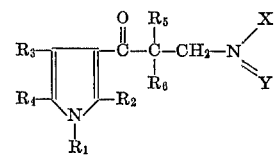

and (2) salts of (1) with pharmaceutically acceptable acids:

wherein:

$R_1$ is a member of the group consisting of hydrogen, an alkyl group having a maximum of four carbon atoms, phenyl, benzyl and pyridyl, $R_2$, $R_3$ and $R_4$ are members of the group consisting of alkyl, alkenyl and cycloalkyl having a maximum of eight carbon atoms, phenyl, halophenyl, (lower alkoxy)-phenyl and benzyl, $R_5$ is a member of the group consisting of hydrogen, alkyl and alkenyl having a maximum of eight carbon atoms, cycloalkyl having a maximum of eight carbon atoms, phenyl and benzyl, $R_6$ is a member of the group consisting of hydrogen and methyl, and when $R_5$ is linked with $R_6$, they form a ring having a maximum of six carbon atoms, X and Y are members of the group consisting of hydrogen, lower alkyl, hydroxy-lower alkyl, lower acycloxyalkyl, carbamyloxy-lower alkyl and phenyl-lower alkyl cycloalkyl, and when X is linked with Y they form a heterocyclic ring having a maximum of eight members selected from the group consisting of piperidyl, (lower alkyl) piperidyl, di(lower alkyl) piperidyl, (lower alkoxy) piperidyl, hydroxypiperidyl, (lower acyloxy) piperidyl, pyrrolidyl, (lower alkoxy) pyrrolidyl, (lower alkyl) pyrrolidyl, hydroxypyrrolidyl, morpholinyl, (lower alkyl) morpholinyl, thiamorpholinyl, (lower alkyl) thiamorpholinyl, di(lower alkyl) thiamorpholinyl, (lower alkoxy) thiamorpholinyl, piperazyl, (lower alkyl) piperazyl, di(lower alkyl) piperazyl, (lower alkoxy) piperazyl, phenylpiperazyl, hydroxyalkylpiperazyl, lower acyloxy-lower alkylpiperazyl and carbamyloxy-lower alkyl piperazyl, wherein "lower" designates a group having up to 5 carbon atoms.

2. A 2-di(lower alkyl)aminoethyl 2,4,5-tri(lower alkyl)pyrrol-3-yl ketone.

3. A 2-(heterocyclo amino)ethyl 2,4,5-tri(lower alkyl)pyrrol-3-yl ketone, the heterocycloamino group is a substituted or unsubstituted heterocyclic moiety as represented by the group X-N-Y as defined in claim 1 in which the heterocyclic ring is saturated and contains not more than eight members.

4. A 2-di(lower alkyl)aminoethyl 1,2,4,5-tetra(lower alkyl)pyrrol-3-yl ketone.

5. A 2-(heterocyclo amino) ethyl 1,2,4,5-tetra(lower alkyl) pyrrol-3-yl ketone, the heterocycloamino group is a substituted or unsubstituted heterocyclic moiety as represented by the group X-N-Y as defined in claim 1.

6. A 2-di(lower alkyl)amino-1-(lower alkyl)ethyl 2,4,5-tri(lower alkyl)pyrrol-3-yl ketone.

7. A 2-(heterocyclo amino)-1-(lower alkyl)ethyl 2,4,5-tri(lower alkyl)pyrrol-3-yl ketone, the heterocycloamino group is a substituted or unsubstituted heterocyclic moiety as represented by the group X-N-Y as defined in claim 1.

8. A 2-di(lower alkyl)amino-1-(lower alkyl)ethyl 1,2,4,5-tetra(lower alkyl)pyrrol-3-yl ketone.

9. A 2 - (heterocyclo amino) - 1 - (lower alkyl)ethyl 1,2,4,5-tetra(lower alkyl)pyrrol-3-yl ketone, the heterocycloamino group is a substituted or unsubstituted heterocyclic moiety as represented by the group X-N-Y as defined in claim 1.

10. 2 - dimethylaminoethyl 2,4,5 - trimethylpyrrol-3-yl ketone.

11. 2 - dimethylaminoethyl 4 - ethyl - 2,5 - dimethylpyrrol-3-yl ketone.

12. 4 - butyl-2,5-dimethylpyrrol-3-yl 2-dimethylaminoethyl ketone.

13. 4 - butyl - 2,5-dimethylpyrrol-3-yl 2-piperidinoethyl ketone.

14. 1-ethyl-2,4,5-trimethylpyrrol-3-yl 2-piperidino-ethyl ketone.

15. 1-benzyl-2,4,5-trimethylpyrrol-3-yl 2-dimethylaminoethyl ketone.

16. 2-(1-dimethylamino)butyl 2,4,5-trimethylpyrrol-3-yl ketone.

References Cited

UNITED STATES PATENTS

| | | | |
|---|---|---|---|
| 3,164,597 | 1/1965 | Leonard | 260—294.7 |
| 3,192,230 | 1/1965 | Lunsford et al. | 260—326.5 |

OTHER REFERENCES

Meshkavskaite et al.: Chem. Absts., vol. 58, col. 6794F (1963).

JOHN D. RANDOLPH, *Primary Examiner.*

A. D. SPEVACK, *Assistant Examiner.*

UNITED STATES PATENT OFFICE
CERTIFICATE OF CORRECTION

Patent No. 3,410,857                                                                November 12, 1968

Karl Schoen et al.

It is certified that error appears in the above identified patent and that said Letters Patent are hereby corrected as shown below:

Column 3, after line 35, insert as a heading -- REACTION SCHEME III --.
Column 9, line 59, title line of EXAMPLE 31, "4." should read -- 4, --.
Column 12, line 17, "diamethylamine" should read -- dimethylamine --.
Column 13, line 63, "comminuator" should read -- comminutor --; same column 13, lines 72 and 73 and column 14, line 18, "mg", each occurrence, should read -- mg. --; same column 14, lines 33 and 34, that portion of the formula reading

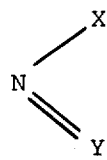   should read   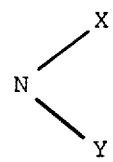

Signed and sealed this 17th day of March 1970.

(SEAL)
Attest:

EDWARD M. FLETCHER, JR.                                      WILLIAM E. SCHUYLER, JR.
Attesting Officer                                            Commissioner of Patents